United States Patent [19]

Fleischmann

[11] Patent Number: 4,706,883
[45] Date of Patent: Nov. 17, 1987

[54] PUMP HEATING SYSTEM

[76] Inventor: Dale Fleischmann, Box 38, Wausau, Wis. 54401

[21] Appl. No.: 715,752

[22] Filed: Mar. 22, 1985

Related U.S. Application Data

[63] Continuation of Ser. No. 489,477, Apr. 28, 1983, abandoned.

[51] Int. Cl.$^4$ ............................................. G05D 23/00
[52] U.S. Cl. ..................... 237/2 B; 62/238.6
[58] Field of Search ................... 237/2 B, 13, 8 R, 56; 62/238.6, 324.1, 324.2, 324.3, 325; 165/58, 59

[56] References Cited

U.S. PATENT DOCUMENTS 4,093,868 6/1978 Manning ............................... 237/13
4,322,953 4/1982 Ramlow et al. ................... 62/238.6

Primary Examiner—Henry A. Bennet
Attorney, Agent, or Firm—Fuller, Puerner & Hohenfeldt

[57] ABSTRACT

A heating system employing a heat pump utilizes heat from the cows in a dairy barn as a low grade source of heat to heat a residence. A closed loop circulation system between a heat exchanger in a house and the heat exchanger in the barn employs a water-based heat transfer fluid. This eliminates the need for long refrigerant lines running between the house and the barn. The heat exchangers in the residence convert the barn heat to Freon and transfer heat from the Freon to the residence. The house heat exchangers are divided into two sections connected in parallel to improve heat transfer and overall efficiency and reduce pressure losses.

11 Claims, 2 Drawing Figures

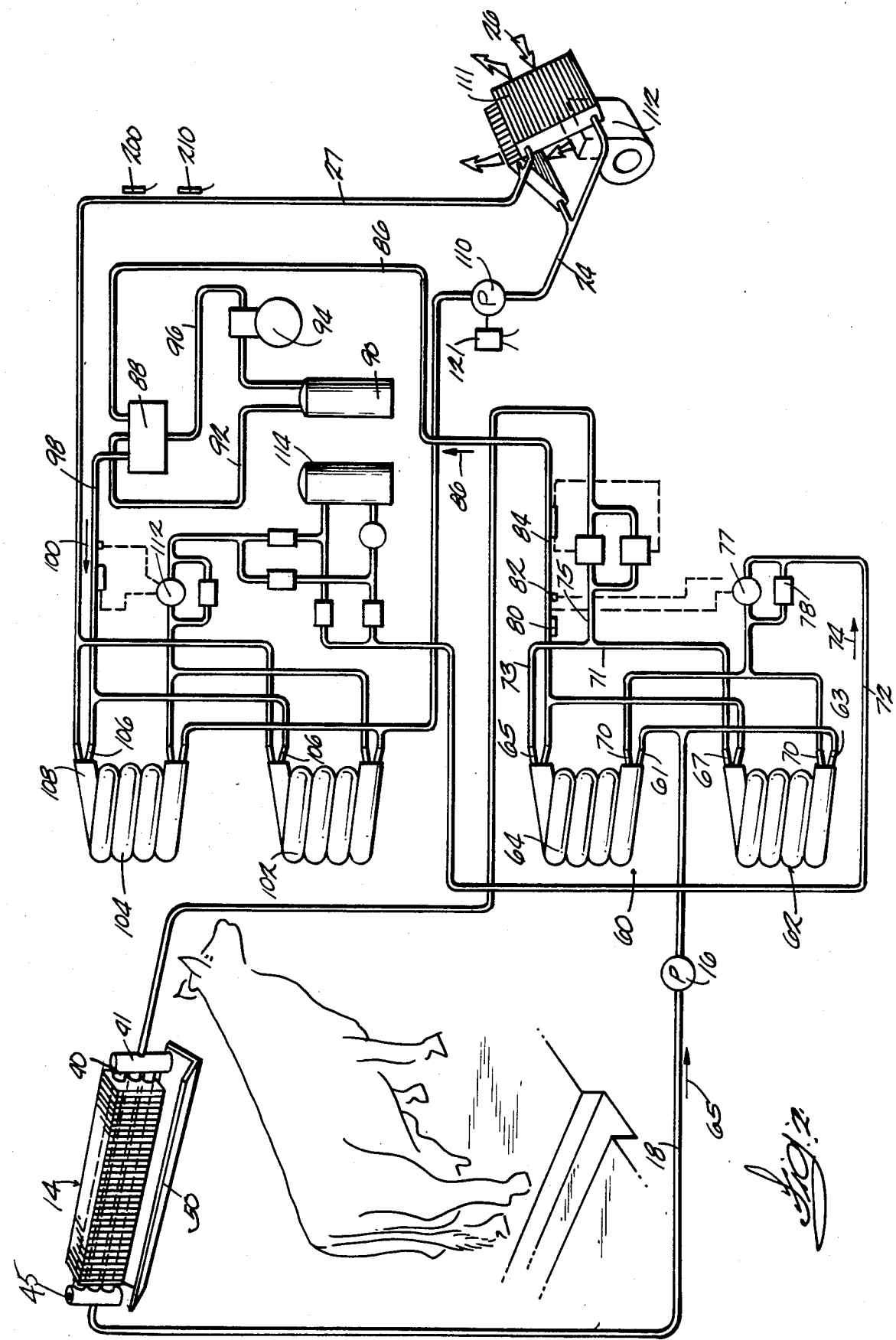

PUMP HEATING SYSTEM

This application is a continuation of application Ser. No. 489,477, filed Apr. 28, 1983, now abandoned.

BACKGROUND OF THE INVENTION

The present invention relates to heat pumps and the use of heat pumps to heat buildings. A dairy farm is disclosed herein as an example of a heat source. Other heat sources, such as solar or ground water, could be employed. It is known in the art to use a dairy barn as a source of heat to heat a residence. U.S. Pat. No. 4,263,785 is an example of the use of heat from animals to increase the heat of Freon in a refrigeration circuit which is used with a heat pump for residential heating and other purposes. Commonly barns are located remote from the farm residence and very long refrigeration lines are required. These long lines use a substantial amount of expensive Freon and also are subject to freezing.

Climate control in dairy barns with uniform temperatures and humidity control are recognized objectives for healthy and productive dairy cows. The present system can be employed to assist in maintaining a desirable farm environment.

SUMMARY OF THE INVENTION

The heating system of the invention employs a heat exchanger system which avoids the need for refrigeration circuits extending from the house to the barn. A first closed loop circulation system between the barn and the house employs a water based or water and alcohol heat transfer fluid which is intermittently circulated through a heat input heat exchanger in a barn to a second heat exchanger at the house. The input heat exchanger picks up the heat from the livestock or cows in the barn and the heat transfer fluid conveys the heat to the second heat exchanger where the heat is given up to liquid Freon which is converted to a gas by the heat. The heat pump compressor increases the temperature and pressure of the gas which is released into a third heat exchanger where gaseous Freon converts to a liquid and gives up its heat to a water-based transfer fluid in a second closed loop water-based circulation system which transfers the heat from the Freon to an output or building air heat exchanger. Relatively short Freon refrigeration lines are involved between the second and third heat exchangers and the heat pump and associated components. The long refrigeration lines to the barn in prior art barn residence heating systems are eliminated. The use of water-based transfer fluid improves the coefficient of performance of the system.

To further improve heat transfer and the coefficient of performance, the second and third heat exchangers are divided into two separate but adjacent units connected in parallel, with each unit having a separate input and output for both Freon and transfer fluid. This increases the residence time of the transfer fluid in the heat exchangers to enhance heat transfer between the fluid and Freon. The use of divided heat exchangers reduces the pressure loss which would occur in a continuous heat exchanger coil which would have the equivalent length of the two coils 62 and 64. The increased heat transfer from the two closed loop water circuits to or from Freon reduces the size compressor required and thus reduces the electrical energy required to operate the system.

Other sources of heat such as a well, well water or a solar collector can be employed. The invention also includes a control system operated by the building room thermostat and a transfer fluid conduit thermostat which allows the room heat exchanger to continue to give off heat to the room during the heating cycle when the compressor is turned off and until the transfer fluid drops in temperature within selected ranges. This mode of operation increases the overall COP.

Further objects, advantages and features of the invention will become apparent from the disclosure.

DESCRIPTION OF THE DRAWINGS

FIG. 2 is a diagrammatic perspective view of the heating-cooling system of the invention and the heat pump circuit.

DESCRIPTION OF THE PREFERRED EMBODIMENT

Figure 1:
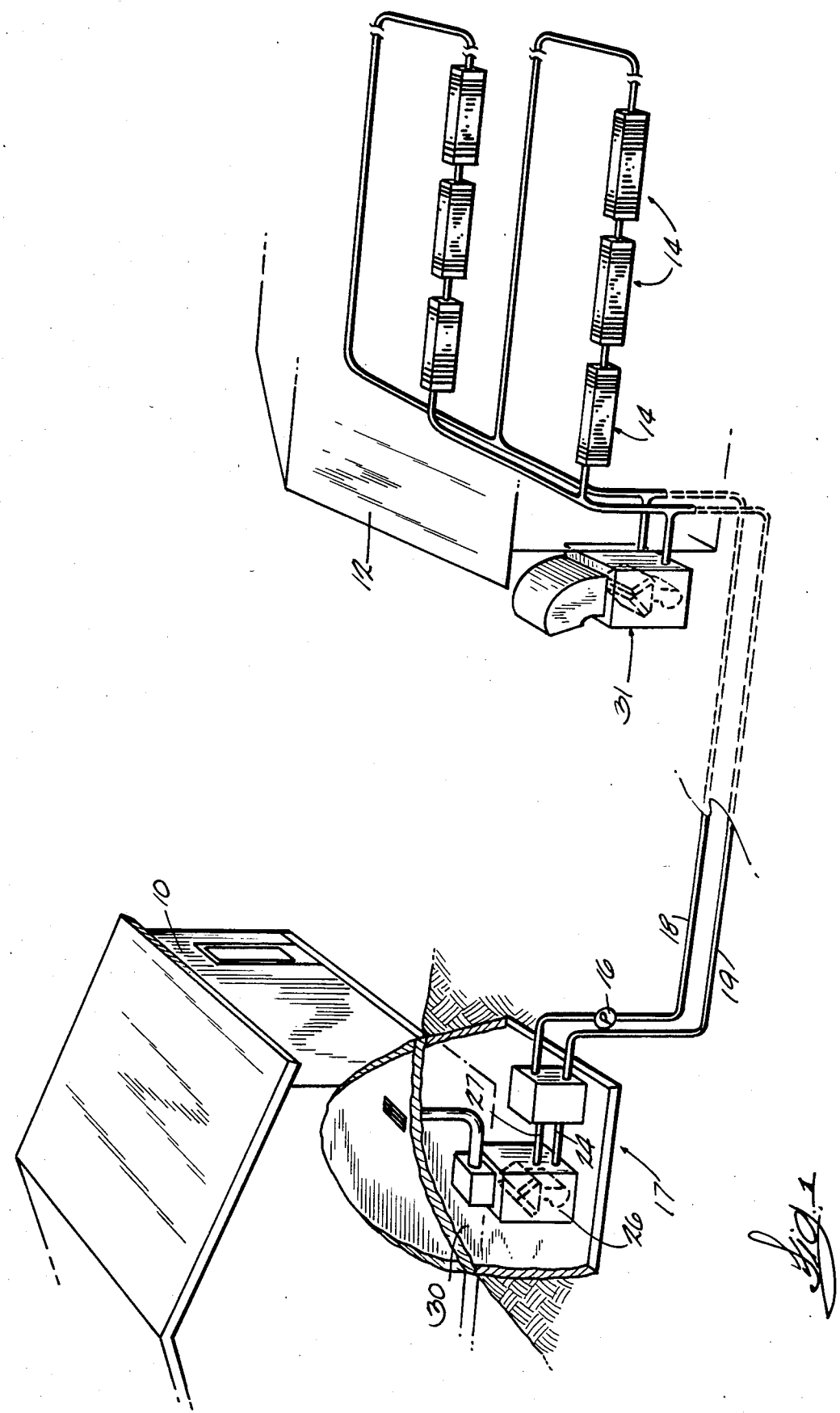
FIG. 1 is a diagrammatic perspective view of the heating-cooling system of the invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows a house 10 and a barn 12. A plurality of heat exchangers 14 are arranged over the stalls of dairy cows in the barn 12. The heat from the cows heats the working fluid circulating in the heat exchangers. The heat transfer fluid which has absorbed heat is conveyed by pump 16 through conduit 18 to a heat pump system generally designated 17. The heat pump system 17 upgrades the heat of the transfer fluid circulating through conduit 18 in a first closed loop water circulating system. The compressor 94 upgrades the heat from the first system and a second closed loop circulation system is employed including conduits 24 and 27 to convey heated fluid through a building or room heat exchanger 26. The heat exchanger 26 releases the heat into the interior 30 of the building 10 during the heating cycle.

When using the system in the air conditioning mode to cool the house, an outdoor heat exchanger 31 may be employed which removes heat from the transfer fluid circulated through conduits 18 and 19 from the house. Usually the heat exchanger 30 is not required.

More specifically, and referring again to the heat exchangers 14 as illustrated in FIG. 2, the heat exchangers 14 each include a plurality of horizontally extending finned conduits 40 arranged in a vertical plane and connected in parallel by headers 41. The individual units 14 can be connected in series, as illustrated in FIG. 1, or in parallel. The heat exchangers 14 are desirably positioned over each stall or in spaced locations in a free stall dairy barn. The banks of fins and conduits are located over a drip trough 50 so that the moisture will drip into a gutter or trough 50 for disposal. The heat exchangers are positioned so that they pick up the convected heated air above the cows and the air, with heat removed, flows downwardly by gravity around the cow.

The heated transfer fluid is conveyed by conduit 18 to a first transfer fluid-refrigerant heat exchange assembly 60 which includes first and second conduit coil sections 62, 64. The heat exchange coils 62 and 64 have transfer fluid inputs 61, 63 connected in parallel to the conduit 18. During the building heating cycle the flow of the heated fluid goes in the direction of arrow 65 into the inlets 61, 63 of each heat exchanger section 62 and 64. The heat exchangers 62 and 64 have concentrically located inside and outside coils with the conduit 18 connected to the outside coil which can be 1¼ inch plastic tubing and which carries the transfer fluid pumped from the barn. The inside Freon conduit 70 in each coil is preferably a µ inch copper nickel tubing. The heat exchanger is sized an overall 26 feet per ton of capacity as compared with typical and conventional heat exchanger ratio of 11 feet per ton, as hereinafter discussed.

Heating Mode

The outlets 65, 67 of the transfer fluid conduit are connected in parallel to return line 75 by conduits 71, 73. Return line 75 returns the transfer fluid to the barn heat exchanger 14 or other heat source. The division of flow of the transfer fluid coils in heat exchange assembly 60 results in reducing the velocity of the transfer fluid flow caused by circulation of pump 16, which thus causes an increase in residence time of the barn transfer fluid in heat exchange relationship in the coil assembly 60. Because of the increased residence time, more heat can be transferred to the Freon. Similarly, the divided Freon coil increases the residence time of the Freon by reducing the velocity of the Freon. The increased residence time of the Freon results in elevating the temperature of the Freon above that which would result from a lesser residence time in the heat exchange coils. The increased temperature increment also causes greater expansion of the Freon and higher Freon pressures delivered to the compressor. Hence the Freon introduced into the compressor has a higher temperature and pressure than that introduced with the undivided coil. This reduces the amount of electrical energy required to operate the compressor and circulation pumps, thus increasing the efficiency over prior art heat pump constructions.

For example, with an undivided heat exchange coil the Freon entering the coil may have a pressure of 40 psig and that exiting the coil a pressure of 45 psig. The temperature of the entering Freon may be 18° F. and the exit temperature may be 28° F. With the divided coil assembly 60, as shown in FIG. 2, the pressure increase may be for example from 40 psi to 49 to 50 psi and the temperature increase from 18° F. to 38° F. To obtain a super heat of 20° F. with an undivided prior art coil, an increase in compressor capacity and increase in circulation pump capacity would be required.

Based on actual tests with entering water temperatures of 50° F. in a single heat exchanger coil vs. divided heat exchanger, the output with the single heat exchanger coil was 64,300 btuh and a COP of 3.61 and with a divided coil the output was 81,250 btuh and a significantly improved COP of 4.9.

These benefits cannot be achieved by merely increasing the length of an undivided heat exchange coil. The length of the conduit or coil through which Freon is circulated has to be matched with the compressor capacity or design back pressure for that compressor. A certain minimum pressure is required to achieve return of all of the compressor oil which gets into the Freon plumbing system. Increasing the length of the coil would result in increasing the total pressure drop and require a larger compressor to produce a lesser heat output which would decrease rather than increase the COP. Also, a larger circulating pump would be required. Dividing the heat exchange coil reduces velocity and causes only a minimal pressure drop. Furthermore, the total pressure drop through the divided coil is less than that through a single coil of the same length because of the paralleling of flow and the reduction of the length of conduit the fluids must flow through. This minimization of pressure drop can enable use of even greater lengths of conduit to increase heat exchange between the transfer fluid and Freon without causing an imbalance between compressor capacity and total conduit length. For example, a conduit length of 26 to 28 feet per ton of compressor capacity is typically employed in commercial embodiments of the invention. Various prior art units with an undivided coil employ 11 to 18 feet per ton. The divided heat exchangers and the reduction of pressure drop otherwise encountered also reduces the size of the circulatory pump required to move the transfer fluid between the input and output heat exchangers. This reduces the electrical power consumption of the total system.

During the building heating cycle (FIG. 2), the liquid Freon is introduced into the heat exchangers through conduit 72, with the Freon flowing in the direction of the arrow 74. The Freon flow is regulated by an expansion valve 77 and one-way valve 78. The expansion valve has a temperature sensor control 80 and a tap 82 in line 84. The tap 82 senses pressure and equalizes the system after shutdown. During the heating cycle, the output from the heat exchangers 62 and 64 is in the form of gaseous Freon which is conveyed by conduit 84 in the direction of arrow 86 to a reversing valve 88. In the heating mode the gaseous Freon conventionally goes through a suction accumulator 90 via conduit 92 and then to a compressor 94 where the temperature and pressure of the gas is raised. The heated Freon leaves the heat pump through conduit 96 and goes through the reversing valve 88, through conduit 98 in the direction of arrow 100, where it is introduced into a second divided heat exchanger assembly having two coils 102 and 104. This heat exchanger has similar divided coils with an inner Freon coil and an outer water-alcohol coil. The heated Freon is introduced to the inner coil 106 in which the Freon gives off its heat to the water based transfer fluid contained in the outer coils 108. The heat transfer fluid is moved through the water coils 108 by a pump 110 in line 24 which continuously circulates the water during the heating mode through a water-to-air heat exchanger 26 and lines 24, 27 which have a finned conduit 111 with a blower 112 which blows air through the heated fins into the room. The liquid Freon goes through the receiver 114 and then the expansion valve 77 and is returned to the heat exchangers 62 and 64 via line or conduit 72 where it again is gasified.

The heating mode is controlled by a room thermostat 121 and associated switches which control the pump 110 and heat exchanger blowers 112. The room thermostat puts the reversing valve in the heating mode. If the room thermostat calls for heat, pump 110 and blower 112 are energized and thermostat 200 is enabled. If the temperature in the water line 27 is less than the set point of for example 86° F., the compressor 94 will be energized. The pump 16 in the barn circuit is connected by a circuit so that it is simultaneously energized with the compressor. The compressor will run until the high setting for thermostat 200, of for instance 90° F., is sensed and the circulating pump 16 will be shut down. However, the circulating pump 110 and blower 112 will continue to operate and introduce heat into the room even though the compressor is not drawing power until the selected room temperature is attained and sensed by thermostat 121. This significantly increases the COP.

Cooling Mode

The room thermostat will switch the reversing valve to the cooling cycle when the room air conditioning unit is switched to air conditioning mode. If the room thermostat 121 calls for cooling, the circulating pump 110 and blower 112 will be energized. A thermostat and bulb 210 control temperature of the transfer fluid in conduit 109. If the temperature in conduit 27 is above a set point of for example 40° F., the compressor 94 will be energized and the compressor 94 will run until the 40° F. is sensed in conduit 27 and the compressor 94 and circulating pump 16 are deenergized. The blower 112 and pump 110, however, will continue to operate until the temperature of the room as sensed by thermostat 121 drops to the control setting of thermostat 121 and de-energizes pump 110 and blower 112.

In the cooling mode, the pump 110 circulates transfer fluid through the heat exchangers 102 and 104. Heat is picked up in the building by the transfer fluid and transferred to the Freon and the exchangers 102 and 104 and the Freon goes to the compressor to increase its heat and pressure. Freon then travels to the source water heat exchangers 62 and 64 where it releases its heat into the source water which is conveyed by pump 16 to the barn heat exchangers. The Freon flow route is illustrated in FIG. 2 by broken arrows for the cooling mode.

In the cooling mode, the heat exchanger 30 can be optionally used, but tests indicate that it is not necessary. A valve 120 in line 19 can be employed to prevent circulation through the heat exchangers 14 in the barn but provide circulation of the transfer fluid through the outside heat exchanger 30 where building heat is released as the blower removes heat from the transfer fluid.

The advantages obtained using the divided and parallel flow for the heat exchangers 60, 62 are also obtained with the heat exchangers 14. The use of the divided flow minimizes the pressure drop through each heat exchanger 14 and increases the residence time of the transfer fluid in the exchanger. A preferred embodiment of the heat exchangers 14 would include headers having an inside diameter of 1½ inches with conduits of inside diameter of ½ inch. The fins each consist of a single apertured plate with conduits 40 extending through the apertures. The fins 43 desirably have a height of 10 inches and width of at least 1 inch. Eight conduits 40 in each heat exchanger has worked well. An air vent 45 and the top of a header 41 assists in initially filling the heat exchanger with tranfer fluid.

The use of water-methanol rather than ethylene glycol also requires a pump of less capacity, and a smaller motor because ofthe lesser viscosity of the water-methanol mix.

I claim:

1. A system for utilizing heat generated by livestock in an agricultural operation to heat a residence, including a first heat exchanger located in the barn, a second heat exchanger located remote from said barn, in a heat pump unit at said residence, a plumbing circuit for circulating a water-based transfer medium between said first and second heat exchangers in a closed loop, a third heat exchanger in said heat pump unit, a refrigerant circuit communicating with said second and third heat exchangers and including refrigerant coils in said second and third heat exchangers, and a compressor associated with said refrigeration circuit and a second closed loop plumbing circuit for circulating water between said third heat exchanger and a fourth heat exchanger which heats the residence and wherein each of said second and third heat exhangers in said heat pump unit is divided with separate inputs and outputs for the divided units connected in parallel to the respective plumbing circuits.

2. The system of claim 1 in which each of said second and third heat exchangers is divided with separate inputs and outputs connected in parallel to the respective plumbing circuits.

3. The improvement of claim 1 in which said barn heat exchangers comprise inlet and outlet manifolds connected to the first water circulation circuit, and heat exchangers having a plurality of conduits connected in parallel between said manifolds and fins on said conduits.

4. The improvement of claim 3 in which the heat exchanger conduits are arranged in two angularly related banks, with the fins similarly oriented to afford collection of condensate along a line intermediate the banks and at the juncture of the banks.

5. The improvement of claim 1 including a heat exchanger located adjacent said barn for removing heat from the heat transfer fluid in said first circuit when said system is in a building cooling mode.

6. A heating system including a compressor, an input heat exchanger, an output heat exchanger, first and second transfer fluid-refrigerant heat exchange asemblies, each of said assemblies including first and second conduit coil sections with an inner refrigerant line located within the outer transfer fluid conduit, the inputs of said refrigerant and transfer coil sections being connected in parallel to divided the input flow and reduce the velocity of flow from a first velocity to a second velocity through said conduits and said conduit outputs being connected in parallel to rejoin the divided fluid flows from the first and second coil sections to return the flow to a velocity higher than said second velocity and a refrigerant plumbing circuit connecting said compressor and said input and output exchangers and said first and second heat exchange assemblies.

7. A heating system in accordance with claim 6 wherein said transfer fluid employed in the plumbing circuits is a water-methanol mix with more than 50% methanol.

8. A heating system including a compressor, an input heat exchanger, an output heat exchanger having a blower, first and second transfer fluidrefrigerant heat exchange assemblies, and a plumbing circuit connecting said compressor and said input and output exchangers and said first and second heat exchange assemblies, said circuit including a circulating pump in said circuit between said output heat exchanger and its associated transfer fluid-refrigerant heat exchange assembly and a return transfer fluid conduit from said output heat exchanger to said transfer-fluid-refrigerant assembly, and including a room thermostat and a circuit elecrically connecting said thermostat to said circulating pump and said blower, a line thermostat having a sensor in sensing relation to said transfer fluid return conduit and circuit means electrically connecting said line thermostat to said compressor and connected room thermostat so that when said room thermostat enables said line thermostat said compressor can be enabled if required to provide the selected room air temperature and said circulating pump continuing to circulate transfer fluid until said room thermostat attains a selected setting.

9. The heating system of claim 8 wherein said transfer fluid employed in the plumbing circuit between said output heat exchanger and the associated transfer fluid-refrigerant heat exchange assesmblies is a water-methanol mix with more than 50% methanol.

10. A system for utilizing a remote source of heat by including a first heat exchanger located in heat exchange relationship with a source of heat, a heat pump unit including a second heat exchanger located remote from said source, a plumbing circuit for circulating a water-based transfer medium between said first and second heat exchangers, said heat pump unit including a third heat exchanger in close proximity to said second heat exchanger, a refrigerant circuit including relatively short freon lines communicating with said second and third heat exchanges and including refrigerant coils located within said second and third heat exchangers, and a compressor associated with said refrigeration circuit and a second closed loop plumbing circuit for circulating water between said third heat exchanger and a remote fourth heat exchanger which provides useful heat and wherein each of said second and third heat exchangers includes first and second helical conduit coil sections with a refrigerant line located within the outer transfer fluid conduit, the inputs of said refrigerant and transfer coil sections being connected in parallel to divide the input flow and reduce the velocity of flow from a first velocity to a second lower velocity to increase the residence time and the heat transfer relative to the working fluid through said conduits and said conduit outputs being connected in parallel to rejoin the divided fluid flows from the first and second coil sections to return the flow to a velocity higher than said second velocity and a plumbing circuit connecting said compressor and said input and output of said heat exchangers.

11. The heating system of claim 10 including a room thermostat and a circuit electrically connecting said thermostat to said circulating pump and said blower, a line thermostat having a sensor in sensing relation to said transfer fluid return conduit and electrically connected to said compressor and connected to said room thermostat so that when said room thermostat enables said line thermostat said compressor can be enabled if required to provide the selected room air temperature and said circulating pump continuing to circulate transfer fluid until said room thermostat attains a selected setting.

* * * * *